United States Patent [19]

Orimoto et al.

[11] Patent Number: 4,988,472
[45] Date of Patent: Jan. 29, 1991

[54] METHOD OF INSERTING A PIECE INTO A MOLD FOR MOLDING A MOUTH OF A PREFORM

[75] Inventors: Hiroyuki Orimoto; Daiichi Aoki; Yoshiki Miyazawa, all of Komoro, Japan

[73] Assignee: Nissei ASB Machine Co., Ltd., Japan

[21] Appl. No.: 391,564

[22] PCT Filed: Oct. 31, 1988

[86] PCT No.: PCT/JP88/01112
§ 371 Date: Jun. 30, 1989
§ 102(e) Date: Jun. 30, 1989

[87] PCT Pub. No.: WO89/03755
PCT Pub. Date: May 5, 1989

[30] Foreign Application Priority Data

Oct. 31, 1987 [JP] Japan ................................. 62-277015

[51] Int. Cl.⁵ ............................................. B29C 39/10
[52] U.S. Cl. ..................................... 264/273; 264/274; 264/275
[58] Field of Search ................ 264/275, 273, 274, 516

[56] References Cited

U.S. PATENT DOCUMENTS

| | | | |
|---|---|---|---|
| 3,344,468 | 10/1967 | Moslo | 264/275 |
| 3,388,363 | 6/1968 | Novick | 264/275 |
| 4,297,313 | 10/1981 | Duckstein | 264/275 |
| 4,876,915 | 10/1989 | Iuchi | 264/275 |

Primary Examiner—James Lowe
Attorney, Agent, or Firm—Ostrolenk, Faber, Gerb & Soffen

[57] ABSTRACT

This invention provides a method of inserting a piece into a mold for molding a mouth of a preform which utilizes a cavity surface of a mold for molding an outer side of a mouth and a cavity recess for molding a support ring to support a heat resistant short tubular piece within the mold, wherein spacers (3), (4) and (5) in the form of projections are integrally formed at fixed intervals on the outer side of the piece (1) and the fore end of the projection (2). The piece (1) is inserted into a central portion of an opened mold (10) for molding a mouth, after which the mold is closed, the projections (2) and (21) are inserted into the cavity recess (14), the spacers (3), (4) and (5) are pressed against the cavity surface, and the piece (1) is held and secured to the central portion of the cavity (18) by the mold through the spacers.

7 Claims, 3 Drawing Sheets

METHOD OF INSERTING A PIECE INTO A MOLD FOR MOLDING A MOUTH OF A PREFORM

FIELD OF THE ART

This invention relates to a method of inserting various pieces provided within a mouth of a preform into a mouth of a container formed of synthetic resin, for example, polyethylene terephthalate, for the purpose of improving heat resistance, chemical resistance and strength.

BACKGROUND

It is known to insert a tubular synthetic resin piece having a heat resistant resin layer into a mouth of a container principally formed of polyethylene terephthalate, so that the mouth of the container will have two or three layers to improve the heat resistance of the mouth of the container.

Most of the heat resistant layer of the mouth formed by the piece is formed on the surface of the mouth since the piece is inserted into a cavity which molds the mouth, after the resin which forms the container body is poured.

When forming a multilayer mouth of a container using the insert as described above, the piece to be inserted has already been solidified, and therefore the in adhesiveness between the piece and the poured molten resin may be poor. In addition, since the properties of the piece and the molten resin are different from each other, they tend to peel off when an external force is applied even if they are integral when molded. As the case may be, they cannot withstand the external force due to the peeling, and as a result, the piece becomes cracked, failing to achieve the object as a container.

In view of the foregoing, it has been proposed that the piece be inserted into the mouth of the container to be embedded therein as described in Japanese Patent Application Laid-Open No. 61-259946. Since the entire insert piece is covered by the container forming resin, a high load such as torque acting on the piece from the exterior is less than that when the piece is present on the surface. Even if peeling occurs, the contour of the mouth of the container will be maintained, with the result that there is no obstacle to the specification of the mouth.

However, it is very difficult to insert the piece into the middle of the mouth of the container. There is a special problem in that the position of the piece must be mechanically supported within the mold against the pouring pressure of the molten resin. Where the side of the insert piece is supported by means of a pin or the like to stand away from the mold surface, if there are insufficient supporting points, the location of the piece will deviate. Furthermore, a pin trace remains in the molded mouth, and therefore the resultant article is not desirable. Additionally, the construction of the mold is complicated as compared with a conventional mold. This results with loss of many molds and increased costs. It is therefore necessary to further improve the heat resistance of the mouth of the container with a piece used as an intermediate layer.

BRIEF DESCRIPTION OF THE INVENTION

This invention has been developed in view of the above-described problems. It is one object of the invention to provide a new method of inserting a piece into a mold for molding a mouth of a preform in which an insert piece formed of a heat resistant resin as an intermediate layer is located in the mold, the piece itself is supported directly on the mold without using mechanical means to make an insertion thereof into the mold positive, and in pouring the resin for molding a container, it can well withstand the pouring pressure without moving.

It is a further object of this invention to provide a method of inserting a piece into a mold for molding a mouth of a preform which utilizes a cavity surface of a mold for molding an outer side of the mouth and a cavity recess for molding a support ring to firmly support the piece in both longitudinal and lateral directions.

To achieve the aforesaid objects, this invention provides a method for molding a mouth for a container, the method comprises the steps of: placing an insert piece into a mouth molding, the mouth molding mold including a cavity recess for molding a support ring forming part of the mouth, the insert piece including a plurality of spacer projections formed integrally with the insert piece and projecting therefrom at regular intervals about the perimeter of the insert piece, the insert piece being placed in the mouth molding mold at a location where the projections extend into the cavity recess of the mold and are pressed against the surface of the cavity recess so as to fixedly hold the insert piece in a predetermined location in the mold; and pouring a molding material into the mold and around the outside of the insert piece to embed the insert piece inside the molding material.

In the insertion of the piece by the aforementioned means, it is not necessary to hold the piece in place using additional members, and the piece can be always inserted into a fixed position. Furthermore, since the piece is supported by the body and the projection positioned in the cavity recess, it is hard to move the piece in either the longitudinal or the lateral directions and the piece does not deviate from its desired position during the movement of the mouth molding mold. Moreover, there is no difficulty in insertions a core mold into the insert piece a no damage will occur to the mold due unwanted movement of the insert piece. Furthermore, the piece can well withstand the injection pressure when a preform is molded, and therefore, the position of the piece will not deviate due to the injection pressure and exposed to the surface of the mouth, and the connection between the mouth molding resin and the piece becomes further tightened by the spacers projected into the mouth molding resin.

BRIEF DESCRIPTION OF THE DRAWINGS

The drawings show an embodiment of a method for inserting a piece into a mold for molding a mouth of a preform according to this invention.

BEST MODE FOR CARRYING OUT THE INVENTION

Figure 1:
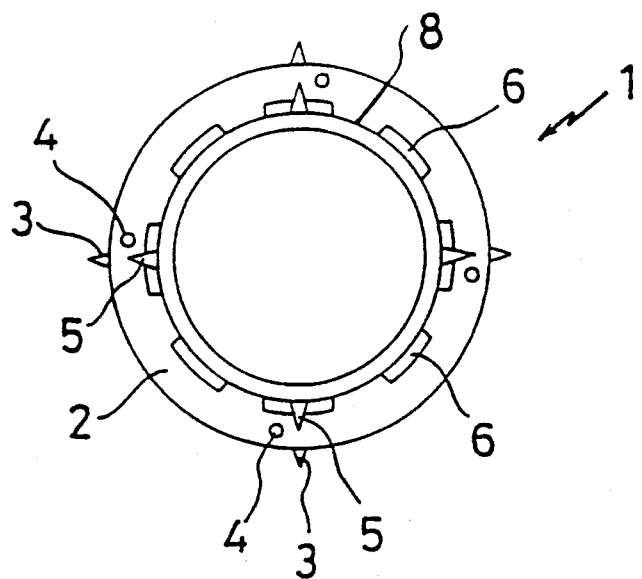
FIG. 1 is a plan view of a piece.
Figure 2:
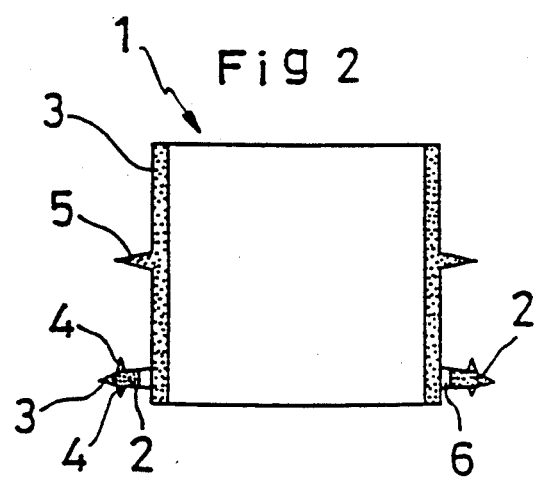
FIG. 2 is a longitudinal sectional view of the piece.

Reference numeral 1 denotes a short tubular piece which is to be inserted as an intermediate layer into a mouth of a preform; The piece 1 is formed from an injection molded body made of synthetic resin which is excellent in heat resistance such as polycarbonate, polyamide, etc. The piece 1 includes a projection, for example, a flange 2, positioned within a support ring formed under the mouth of the preform 1 which projection is integrally formed on the outer side at the lower portion thereof.

Spacers 3, 4 and 5 in the form of projections having a predetermined length and being convergent are located at fixed intervals along the end edge of the flange 2 and the upper and lower surfaces and the side of the body 8. A number of through holes 6 are formed at the connection between the side of the body 8 and the flange 2.

Figure 3:
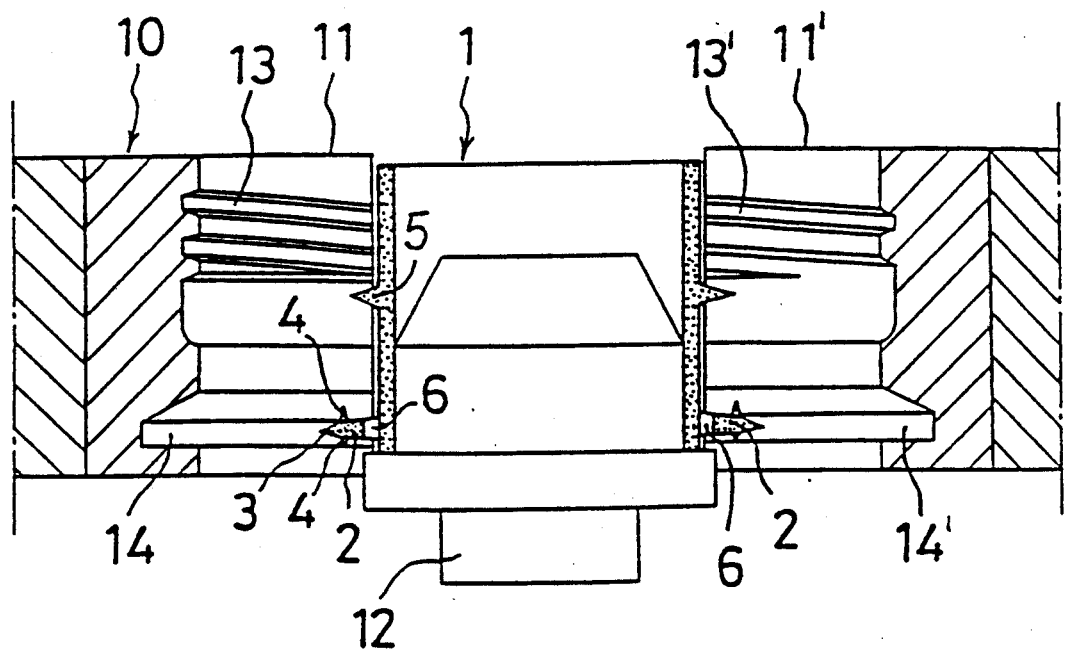
FIGS. 3 to 5 are respectively longitudinal sectional views of a mold for molding a mouth showing the steps of insertion in order.

When a mold 10 for molding a mouth of a preform (the mold comprising a pair of split molds 11 and 11') is opened as shown in FIG. 3, the insert piece 1 is placed on a support member 12 located on the underside of the mold 10 and is inserted into a central portion of the split molds 11 and 11.

Figure 6:
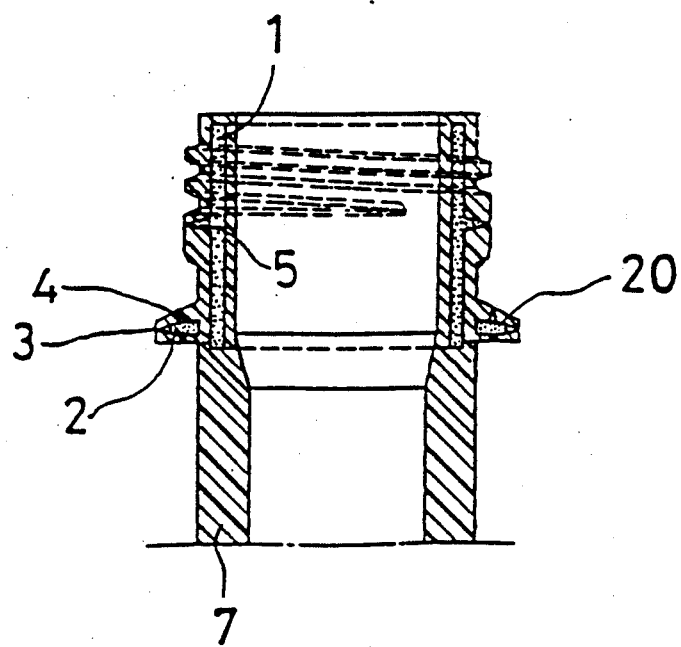
FIG. 6 is a longitudinal sectional view of a preform mouth insert-molded.

The surface of the split molds 11, 11 comprises thread forming surfaces 13, 13' and cavity recesses 14, 14' for molding a support ring thereunder (See ring 20 of FIG. 6). Insertion of the support member 12 is stopped at a position where the flange 2 is positioned at the cavity recesses 14, 14' and the insert piece 1 is held in that state.

Figure 4:
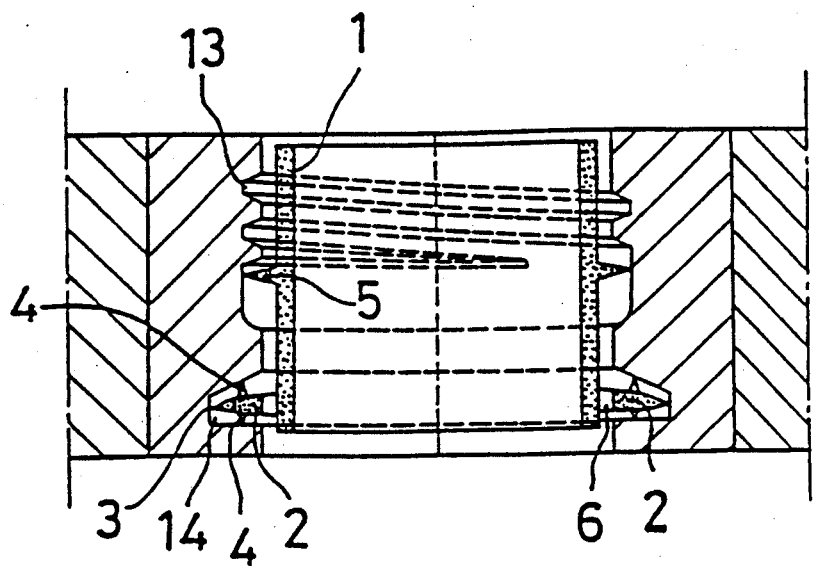

After the insert piece 1 has been inserted as described above, the split molds 11 and 11 are closed in the conventional manner. By this closure, the insert piece 1 is accommodated within the mold 10 as shown in FIG. 4, and the flange 2 is location is the cavity recesses 14, 14'. Within the cavity recesses 14, 14' the spacers 3 and 4 are urged against the mold surface, and in the thread forming surfaces 13, 13', the spacers 5 on the side of the body 8 are urged against the mold surface and held by the mold 10, whereby the insert piece 1 is locked in place within the mold 10.

Figure 5:
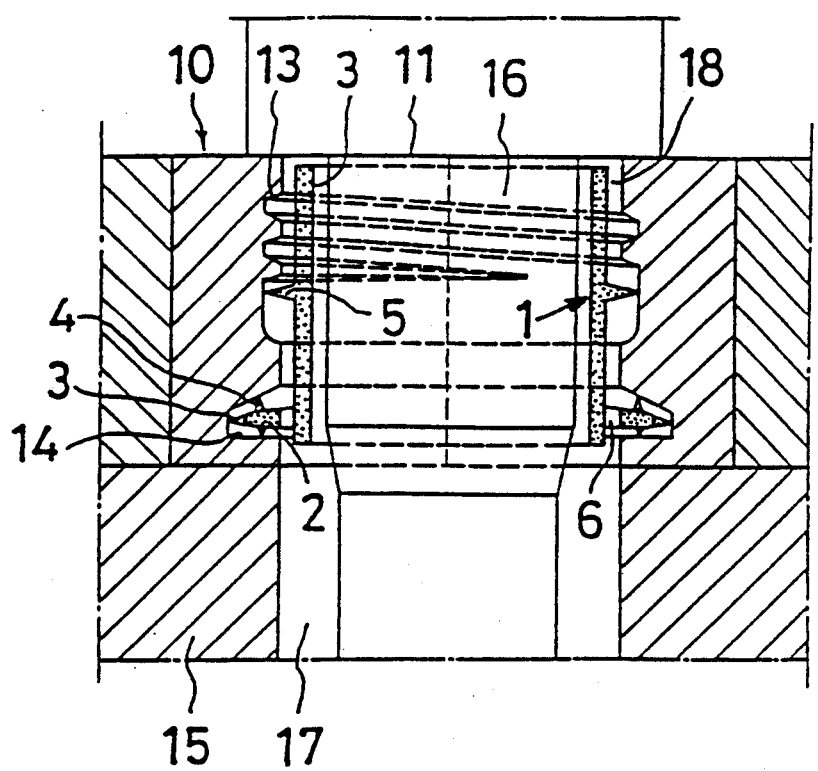

The mouth molding mold 10 accommodating therein the insert piece 1 is then moved onto a preform molding mold 15 as shown in FIG. 5 after the support member 12 has been moved downwardly of the mold and removed from the piece 1, and the core mold 16 is inserted from above. The core mold 16 and mouth molding mold 10 cooperate to form a mouth molding cavity 18 which communicates with the cavity 17 formed by the cooperation of the core mold 16 and the preform molding mold 15. the spacers 3, 4 and 5 formed in the periphery of the insert piece 1 ensure that spaces are formed between the insert piece 1 and the molds 10, 16 to provide a space in which the preform forming resin may be poured to surround the insert piece 1.

Molding of a preform is carried out by clamping the molds 10, 15 and 16 and thereafter injecting resin (such as polyethylene terephthalate) into the cavity 17. The thus injected resin fills the mouth molding cavity 18 via the cavity 17 to form a preform 7 having a sectional construction as shown in FIG. 6. In this preform, the insert piece 1 is provided as an intermediate layer internally of the bottle mouth.

Figure 7:
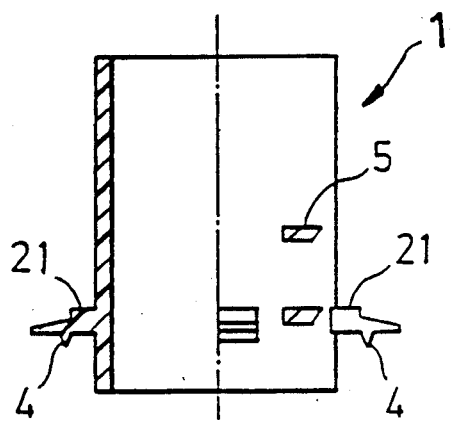
FIG. 7 is a longitudinal sectional front view of a half portion of a piece according to another embodiment.

In the piece 1 shown in FIG. 7, flat triangular projections indicated at 21 in place of the flange are integrally formed at fixed intervals in a circumferential direction, and the spacer 4 is projected only on the under side of the projection 21. In such a piece 1, the flowability of the poured resin is excellent and the flow resistance is small as compared one utilizing the flange 2, and therefore, the molding of a mouth of a container is further facilitated.

The material from which the piece 1 is formed not limited to synthetic resins but inorganic material such as rubber, glass and the like and metal material may also be used.

As described above, according to this invention, the insert piece is supported within the cavity by the mold through spacers in the form of projections formed integrally with the insert piece. Therefore, the mouth molding mold may be as it is, and the piece can be supported along multiple directions to prevent the insert piece from moving after it has been inserted into the mold. The invention is very effective as an piece since it obviates the need to add special operations other than the mold closure and it can well withstand the pouring pressure of the resin. Therefore, the method of this invention may be extensively utilized in the molding industry of synthetic resin containers.

We claim:

1. A method for molding a mouth for a container, said method comprises the steps of:

placing an insert piece into a mouth molding mold, said mouth molding mold including a cavity recess for molding a support ring forming part of said mouth, said insert piece including a plurality of spacer projections formed integrally with said insert piece and projecting therefrom at regular intervals about the parameter of said insert piece, said insert piece being placed in said mouth molding mold at a location wherein said spacer projections extend into said cavity recess of said mold and are pressed against the surface of said cavity recess so as to fixedly hold said insert piece in a predetermined location in said mold; and pouring a molding material into said mold and around the outside of said insert piece to embed said insert piece inside said molding material.

2. The method according to claim 1, wherein said insert piece includes a generally tubular body and a flange extending outwardly from said body, a plurality of through holes being formed in said flange at spaced locations to permit said molding material to flow therethrough, said spacer projections extending from said flange.

3. The method according to claim 5, wherein said insert piece is formed of synthetic resins having a high degree of heat resistance.

4. The method according to claim 5, wherein said insert piece is formed of inorganic material.

5. The method according to claim 1, wherein said insert piece further includes an additional plurality of projections extending outward from said insert piece and being formed integrally therewith, said additional projections contacting a portion of said mold removed from said cavity recess when said insert piece is placed in said mold to further hold said insert piece in said predetermined location in said mold.

6. The method according to claim 1, further including the step of placing a core mold inside of said insert piece before said pouring step, said core mold being inside of and spaced from said insert piece and wherein said pouring step further comprises pouring said molding material around the inside of said insert piece between said insert piece and said core mold so as to fully imbed said insert piece inside of said molding material.

7. The method according to claim 1, wherein said insert piece has a tubular body and wherein said spacer projections extend radially outwardly from said tubular body and also, in a direction generally parallel to said tubular body.

* * * * *